(12) United States Patent
Cairns

(10) Patent No.: US 6,707,857 B1
(45) Date of Patent: Mar. 16, 2004

(54) REFERENCE SIGNAL PRE-DISTORTION FOR TRANSMITTER WITH FREQUENCY SYNTHESIZER BASED PHASE ENCODING

(75) Inventor: Douglas Cairns, Durham, NC (US)

(73) Assignee: Ericsson Inc., Research Triangle Park, NC (US)

( * ) Notice: Subject to any disclaimer, the term of this patent is extended or adjusted under 35 U.S.C. 154(b) by 731 days.

(21) Appl. No.: 09/616,252

(22) Filed: Jul. 14, 2000

(51) Int. Cl.$^7$ ............................................... H04L 25/49
(52) U.S. Cl. ....................................... 375/296; 375/371
(58) Field of Search ................................. 375/296, 285, 375/371, 373, 376; 332/127; 329/307

(56) References Cited

U.S. PATENT DOCUMENTS

| | | | |
|---|---|---|---|
| 4,417,358 A | 11/1983 | Zeis | |
| 4,462,001 A | * 7/1984 | Girard | ........................ 330/149 |
| 4,831,334 A | 5/1989 | Hudspeth et al. | |
| 4,965,531 A | 10/1990 | Riley | |
| 5,053,728 A | 10/1991 | Bogl | |
| 5,323,125 A | * 6/1994 | Hiben et al. | ................. 332/100 |
| 5,847,602 A | 12/1998 | Su | |
| 5,861,777 A | 1/1999 | Sigmon et al. | |
| 5,886,572 A | 3/1999 | Myers et al. | |
| 5,936,464 A | 8/1999 | Grondahl | |
| 5,942,938 A | 8/1999 | Myers et al. | |
| 5,973,556 A | 10/1999 | Su | |
| 5,990,735 A | 11/1999 | Sigmon et al. | |
| 6,011,815 A | 1/2000 | Eriksson et al. | |
| 6,275,685 B1 | * 8/2001 | Wessel et al. | ................ 455/126 |

FOREIGN PATENT DOCUMENTS

WO     WO99/08383     2/1999

OTHER PUBLICATIONS

"Design of a 2.4 GHz CMOS Frequency–Hopped RF Transmitter IC" by Kosunen et al. 1998 IEEE, 2 pages.

* cited by examiner

Primary Examiner—Stephen Chin
Assistant Examiner—Kevin Kim
(74) Attorney, Agent, or Firm—Coats & Bennett, P.L.L.C.

(57) ABSTRACT

A variable frequency synthesizer is used during generation of a phase-encoded signal. The reference signal input to the frequency synthesizer is not held stable and constant, but is instead deliberately varied to control the output of the frequency synthesizer. This varying reference signal, referred to as the phase reference signal, is derived from traditional inphase and quadrature signals, as modified by a phase distorter. The phase distorter applies a pre-distortion to the inphase and quadrature signals so as to compensate for band limiting effects of the frequency synthesizer. The signal transmitted is then based on the phase-encoded signal.

32 Claims, 5 Drawing Sheets

REFERENCE SIGNAL PRE-DISTORTION FOR TRANSMITTER WITH FREQUENCY SYNTHESIZER BASED PHASE ENCODING

BACKGROUND OF THE INVENTION

The present invention relates to communications transmitters, such as cellular telephone transmitters, and more particularly to communications transmitters and wireless communications mobile terminals using frequency synthesizers to generate a phase-encoded signal.

In wireless communications, it is common for signals to be transmitted with both amplitude and phase encoding. For instance, one standard for cellular communications common in North America, TIA/EIA-136, calls for amplitude and phase modulation for encoding information on a carrier frequency. This standard is well known to those of ordinary skill in the art. For TIA/EIA-136, and other standards, it is common to employ an I/Q modulator architecture that uses one or more mixing stages to take a transmit signal from baseband to the appropriate carrier frequency. In these architectures, the Inphase (I) and Quadrature (Q) signal components representing the data to be transmitted are generated at baseband. From baseband, the I and Q signals are mixed to typically two or more intermediate frequencies (in series) and then to the carrier frequency.

BRIEF SUMMARY OF THE INVENTION

In one aspect of the present invention, a variable frequency synthesizer is used during generation of a phase-encoded signal. As with traditional frequency synthesizers, the output of the frequency synthesizer is based at least in part on an input reference signal. In the present invention, the reference signal input to the frequency synthesizer is not held stable and constant, but is instead deliberately varied to control the output of the frequency synthesizer. This varying reference signal, referred to herein as the phase reference signal, is derived from traditional inphase and quadrature signals, as modified by a phase distorter. The phase distorter applies a pre-distortion to the inphase and quadrature signals so as to compensate for band-limiting effects of the frequency synthesizer. The signal transmitted is then based on the phase-encoded signal.

DETAILED DESCRIPTION OF THE INVENTION

The present invention will be discussed in the context of a wireless communications mobile terminal 20. However, it should be understood that the present invention is not limited thereto, but instead applies to any type of communications transmitter using a frequency synthesizer to generate a phase encoded transmission signal.

Figure 1:
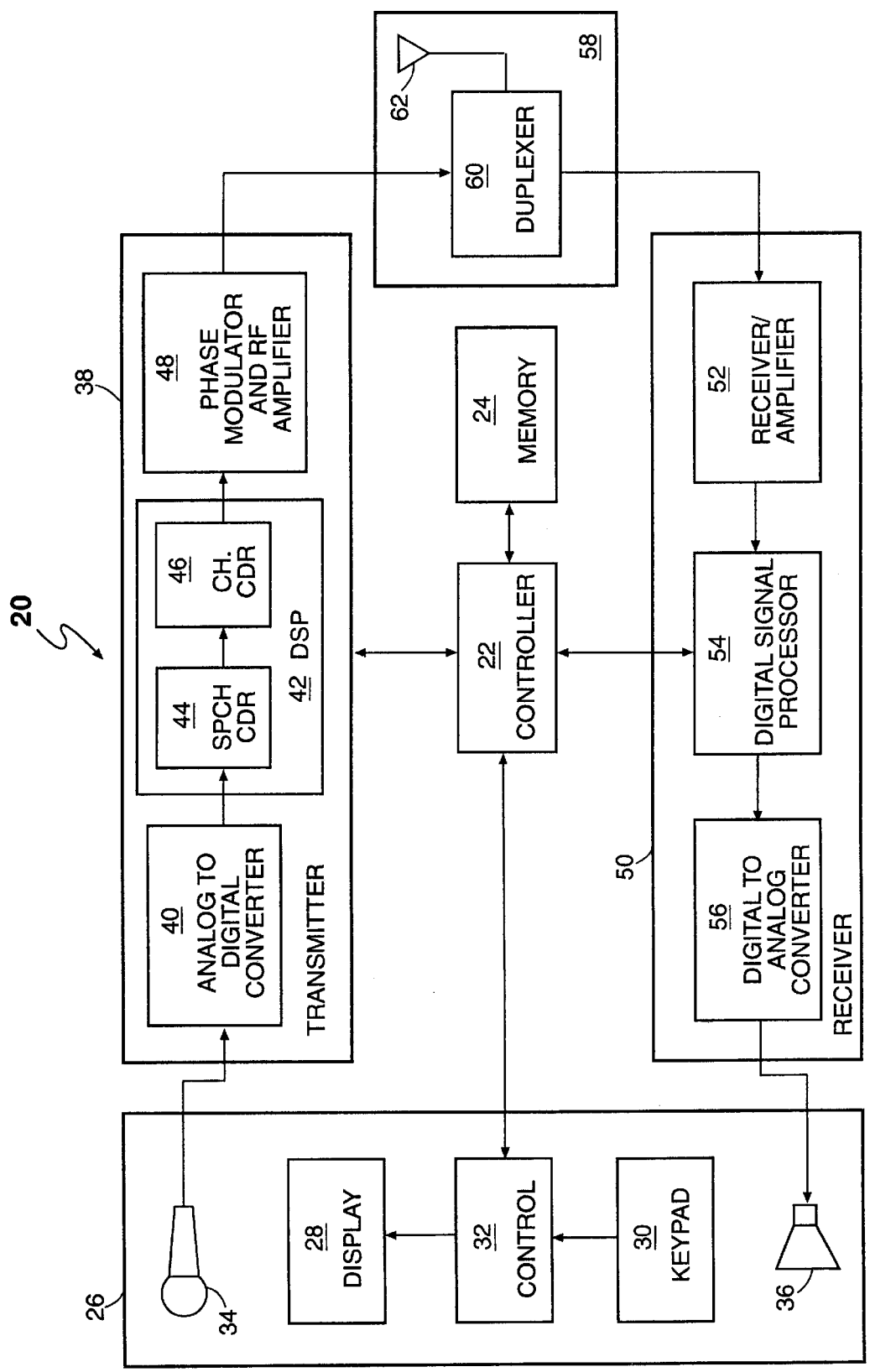
FIG. 1 shows a wireless communications mobile terminal incorporating the present invention.

Referring to FIG. 1, a wireless communications mobile terminal 20 typically includes a controller 22, an operator interface 26, a transmitter 38, a receiver 50, and an antenna assembly 58. The operator interface 26 typically includes a display 28, a keypad 30, a control unit 32, a microphone 34, and a speaker 36. The display 28 allows the operator to see dialed digits, call status, and other service information. The keypad 30 allows the operator to dial numbers, enter commands, and select options. The control unit 32 interfaces the display 28 and keypad 30 with the controller 22. The microphone 34 receives acoustic signals from the user and converts the acoustic signals to an analog electrical signal. The speaker 36 converts analog electrical signals from the receiver 50 to acoustic signals which can be heard by the user.

The analog electrical signal from the microphone 34 is supplied to transmitter 38. The transmitter 38 includes an analog to digital converter 40, a digital signal processor 42, and a phase modulator and RF amplifier 48. The analog to digital converter 40 changes the analog electrical signal from the microphone 34 into a digital signal. The digital signal is passed to the digital signal processor (DSP) 42, which contains a speech coder 44 and channel coder 46. The speech coder 44 compresses the digital signal and the channel coder 46 inserts error detection, error correction and signaling information. The DSP 42 may include, or may work in conjunction with, a DTMF tone generator (not shown). The compressed and encoded signal from the digital signal processor 42 is passed to the phase modulator and RF amplifier 48, which are shown as a combined unit in FIG. 1. The phase modulator converts the signal to a form which is suitable for transmission on an RF carrier. The RF amplifier then boosts the output of the phase modulator for transmission via the antenna assembly 58.

The receiver 50 includes a receiver/amplifier 52, digital signal processor 54, and a digital to analog converter 56. Signals received by the antenna assembly 58 are passed to the receiver/amplifier 52, which shifts the frequency spectrum, and boosts the low-level RF signal to a level appropriate for input to the digital signal processor 54.

The digital signal processor 54 typically includes an equalizer to compensate for phase and amplitude distortions in the channel corrupted signal, a demodulator for extracting bit sequences from the received signal, and a detector for determining transmitted bits based on the extracted sequences. A channel decoder detects and corrects channel errors in the received signal. The channel decoder also includes logic for separating control and signaling data from speech data. Control and signaling data is passed to the controller 22. Speech data is processed by a speech decoder and passed to the digital to analog converter 56. The digital signal processor 54, may include, or may work in conjunction with, a DTMF tone detector (not shown). The digital to analog converter 56 converts the speech data into an analog signal which is applied to the speaker 36 to generate acoustic signals which can be heard by the user.

The antenna assembly 58 is connected to the RF amplifier of the transmitter 38 and to the receiver/amplifier 52 of the receiver 50. The antenna assembly 58 typically includes a duplexer 60 and an antenna 62. The duplexer 60 permits full duplex communications over the antenna 62.

The controller 22 coordinates the operation of the transmitter 38 and the receiver 50, and may for instance take the form of a common microprocessor. This coordination includes power control, channel selection, timing, as well as a host of other functions known in the art. The controller 22 inserts signaling messages into the transmitted signals and extracts signaling messages from the received signals. The controller 22 responds to any base station commands contained in the signaling messages, and implements those commands. When the user enters commands via the keypad 30, the commands are transferred to the controller 22 for action. Memory 24 stores and supplies information at the direction of the controller 22 and preferably includes both volatile and non-volatile portions.

Figure 2:
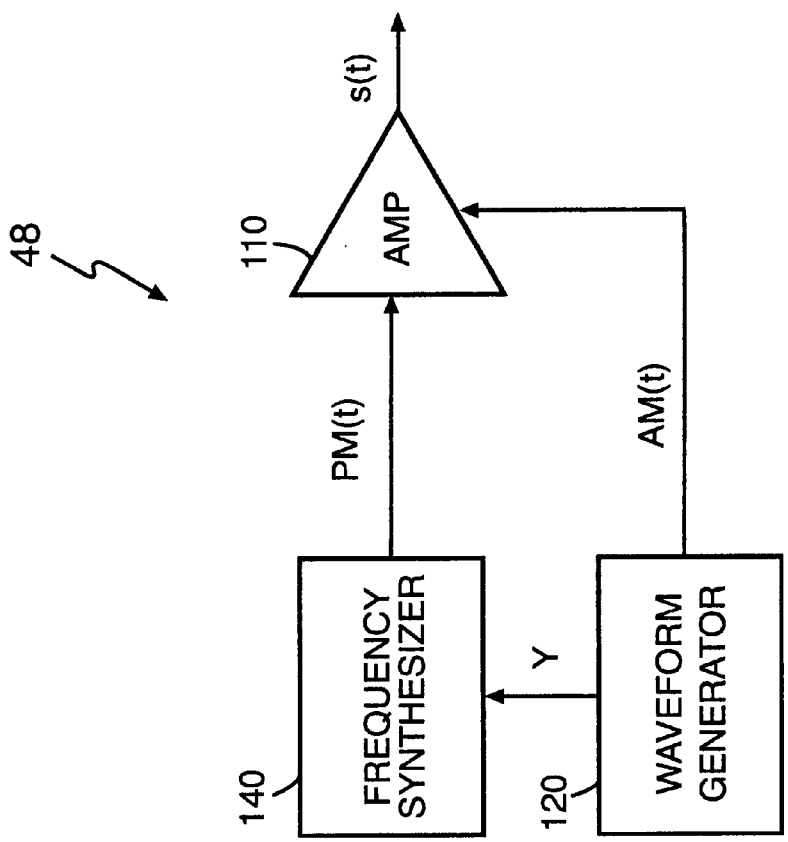
FIG. 2 shows the phase modulator and RF amplifier of FIG. 1 in greater detail.

As noted above, the compressed and encoded signal from the DSP 42 is input to the phase modulator and RF amplifier 48. The phase modulator and RF amplifier 48 is shown in greater detail in FIG. 2. The phase modulator and RF amplifier 48 may be conceptually divided into a waveform generator 120, a frequency synthesizer 140, and an amplifier 110. The waveform generator 120 takes the incoming data stream from the DSP 42 and generates an amplitude component AM(t) and a phase reference signal Y. The frequency synthesizer 140 uses the phase reference signal Y to generate a constant envelope phase component PM(t). The amplifier 110 applies an amplitude modulation to the phase component signal PM(t), based on the amplitude component AM(t), to produce an output signal s(t) at the carrier frequency, in any fashion known in the art, such as the approaches known from AM radio transmitters or those described in U.S. Pat. Nos. 5,990,735, 5,973,556, or the like.

Figure 3:
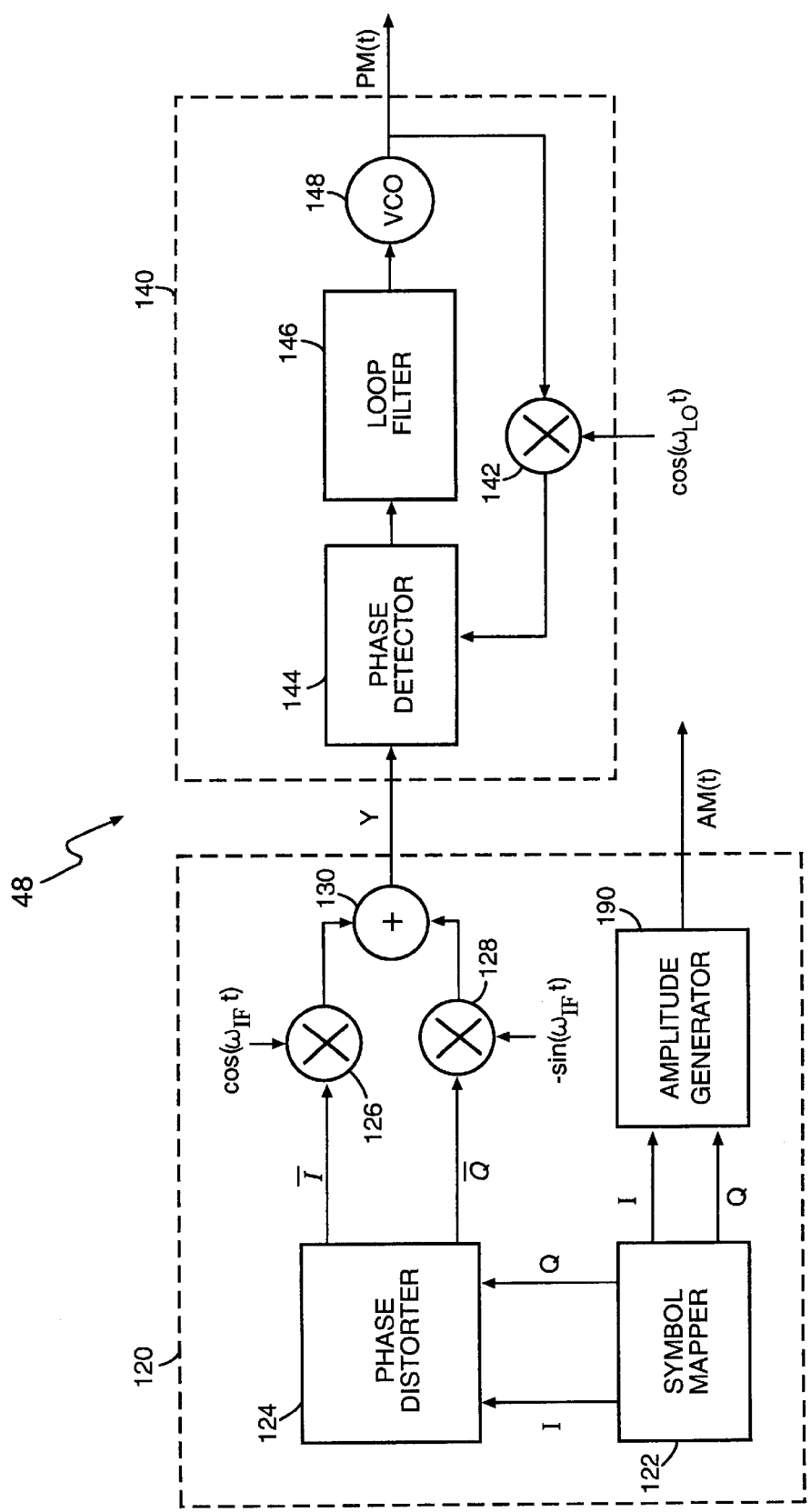
FIG. 3 shows portions of the phase modulator and RF amplifier of FIG. 2 in greater detail.

A portion of the phase modulator and RF amplifier 48 is shown in greater detail in FIG. 3. The waveform generator 120 may be viewed as including a symbol mapper 122, a phase distorter 124, two mixers 126,128, a combiner 130, and an amplitude generator 190. The symbol mapper, which in this illustrative example takes the form of a differential encoder 122, takes the incoming data stream from the DSP 42 and maps the data to the appropriate symbols, thereby encoding the data stream and producing two outputs indicative of the data signal—an inphase component I and a quadrature component Q—in any fashion known in the art. For instance, the differential encoder may use a differential quadrature-phase shift key modulation (DQPSK) or 3π/8 shifted 8-phase shift key modulation (EDGE). While not essential to the present invention, both I and Q are passed to the amplitude generator 190, which operates to generate the amplitude component AM(t) based on I and Q in a fashion well known in the art, with AM(t) in turn fed to amplifier 110. In addition, both I and Q are passed to the phase distorter 124. The phase distorter 124 applies a compensation pre-distortion to I and Q to produce $\bar{I}$ and $\bar{Q}$ as described in more detail below. The $\bar{I}$ and $\bar{Q}$ signals are then passed to respective mixers 126,128 which mix their respective signals from the baseband frequency to a intermediate frequency. For instance, mixer 126 mixes the $\bar{I}$ signal with a cosine function mixing signal at the intermediate frequency while mixer 128 mixes the $\bar{Q}$ signal with a negative sine function version of the same mixing signal at the intermediate frequency. These mixed signals are then passed to the combiner 130 where they are combined in any common fashion. The output of the combiner 130, phase reference signal Y, is fed to the frequency synthesizer 140.

The phase reference signal Y is used to adjust the operation of the frequency synthesizer 140 so as to produce the desired phase variations in the phase component PM(t). While the frequency synthesizer 140 may take a variety of forms well known in the art, for purposes of illustration, the frequency synthesizer 140 will be assumed to be a phase-lock loop (PLL). Referring to FIG. 3, PLL 140 typically includes a phase comparitor 144, a loop filter 146, a voltage controlled oscillator (VCO) 148, and a loop mixer 142. The phase comparitor 144 compares the phase of the output of the loop mixer 142 to the phase reference signal Y from the reference divider waveform generator 120 and generates a phase correction signal based on that comparison. Numerous ways of operating a phase comparitor to produce a phase correction signal based on the input of two signals, a reference signal and a feedback signal, is well known in the art and is omitted herein for clarity as the selection of one particular approach is not important to the operation of the present invention. The phase correction signal from the phase comparitor 144 is directed to the VCO 148 via loop filter 146. Thus, the VCO 148 generates an output signal based at least in part on the reference signal input to the PLL 140. Applied to the present discussion, the VCO 148 generates output signal PM(t) based at least in part on phase reference signal Y. The PLL output signal PM(t) is then passed to amplifier 110. In addition, as is customary in phase-lock loops, the output signal is also fedback to the phase comparitor 144. In the present illustrative example, the output signal PM(t) is sent to the phase comparitor via the loop mixer 142, where it is mixed with a local oscillator signal. In general, the loop mixer 142 acts to mix the output signal PM(t) from the carrier frequency to an intermediate frequency so that comparison with the phase reference signal Y may be easily accomplished. Further, the loop mixer 142 may be used to help select the transmission channel. From the above, it is seen that PLL 140 operates as a phase-lock loop in a fashion similar to that well known in the art; however, the reference input to PLL 140 is a deliberately varying phase reference signal Y rather than the common constant frequency reference signal.

Unfortunately, phase-lock loops have a tendency to band limit the phase component of the modulated signal. In some circumstances, this band limiting may introduce moderate to severe artifacts in the transmitted signal. To compensate for this, the present invention deliberately pre-distorts the phase reference signal Y that is provided to the frequency synthesizer 140. The application of the pre-distortion may be realized by the process shown in FIG. 4. First, the phase distorter 124 converts the I and Q components from the differential encoder 122 to polar form such that $$\rho_k = \sqrt{I_k^2 + Q_k^2} \text{ and } \theta_k = \tan^{-1}\left(\frac{Q_k}{I_k}\right)$$

where $I_k$ is the inphase modulation component at sample time k and $Q_k$ is the quadrature modulation component at sample time k (box 210). The computed phase angle θ is unwrapped so that phase discontinuities are eliminated (box 220). This amounts to choosing $r_k$ in the equation $\phi_k=\theta_k+2\pi r_k$ such that $|\phi_k-\phi_{k-1}|<\pi$. The pre-distortion vector h is applied to the unwrapped phase to generate the pre-distorted phase $\hat{\theta}(k)$, such that $\hat{\theta}_k=\Sigma_n h_n \phi_{k-n}$ (box 230) where n varies from 0 to N−1, where N is the "length" of phase distorter 124. The pre-distorted phase $\hat{\theta}(k)$ is then used to generate $\bar{I}$ and $\bar{Q}$ signals according to $\bar{I}_k=\rho_k \cos(\hat{\theta}_k)$ and $\bar{Q}_k=\rho_k \sin(\hat{\theta}_k)$ (box 240). Signals $\bar{I}$ and $\bar{Q}$ are then mixed to an intermediate frequency by mixers 126,128 and combined by combiner 130 to produce phase reference signal Y (box 250). Signal Y is supplied to PLL 140 as a reference signal input (box 260). As is well known in the art, a phase-lock loops, such as PLL 140, operate to match the phase of their outputs to the phase of the reference signal input to the phase-lock loop, as generally described above. Accordingly, PLL 140 generates PM(t) based on signal Y (box 270) in a fashion well known in the art of phase-lock loops for generating an output signal based on a reference input signal. Signal PM(t) is forwarded to the amplifier 110 and used to generate the transmitted signal in any conventional fashion.

Figure 4:
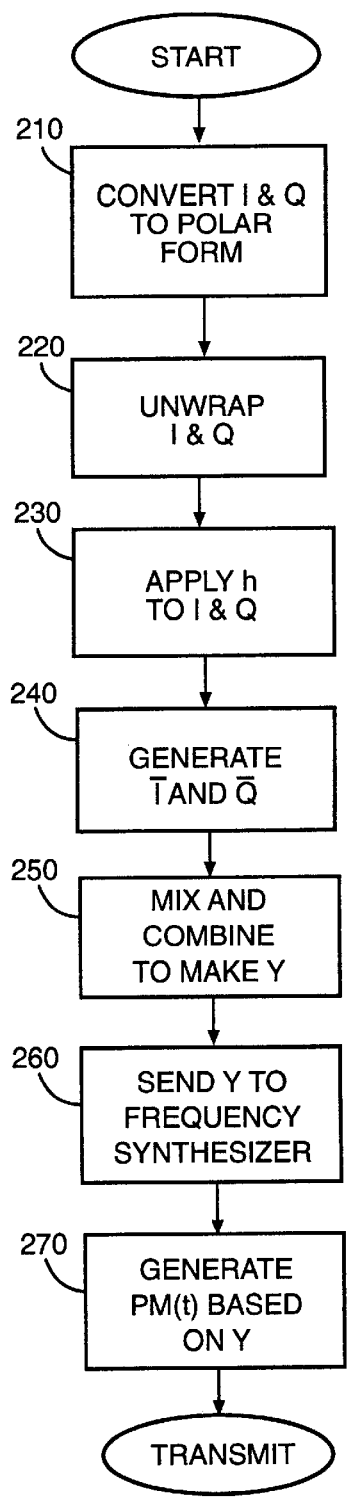
FIG. 4 shows one process flow for applying compensation pre-distortion.

Using the process of FIG. 4 the pre-distortion vector h is used by the phase distorter 124 to generate $\bar{I}$ and $\bar{Q}$ signals. In order to compute the coefficients for pre-distortion vector h, the impulse response of PLL 140 may be measured (analytically or empirically) and modeled as a N×1 vector $f$ where each element of the vector (e.g., $f_0, f_1, f_2, \ldots f_{N-1}$) represents the response of the PLL 140 at the corresponding time index. Based on this impulse response, a matrix F (sometimes referred to as a the impulse response matrix) may be constructed as follows:

$$F = \begin{bmatrix} f_0 & 0 & \cdots & 0 \\ f_1 & f_0 & \ddots & 0 \\ \vdots & f_1 & \ddots & 0 \\ f_{N-1} & \vdots & \ddots & f_0 \\ 0 & f_{N-1} & \ddots & f_1 \\ \vdots & \ddots & \ddots & \vdots \\ 0 & \cdots & 0 & f_{N-1} \end{bmatrix}$$

In order to calculate the compensation vector h used by the phase distorter 124, a desired response vector g must be selected. The desired response vector g may be thought of as the time domain representation of the ideal overall response function of the circuit path from where the pre-distortion is applied (e.g., the phase distorter 124) through the PLL 140. Typically, the desired response vector g will be a vector of mostly zeros with a 1 at position $g_k$ corresponding to the time delay of the output signal of the PLL, PM(t), with respect to the input to the phase distorter 124. Also, other desired response vectors g may be chosen without exceeding the scope of the present invention. Based on the desired response vector g, the compensation vector h used by the phase distorter 124 may be derived by solving the following equation:

$$h = c \frac{\sum_i g_i}{\sum_i c_i} \quad \text{where} \quad c = (F^T F)^{-1} F^T g$$

Figure 5:
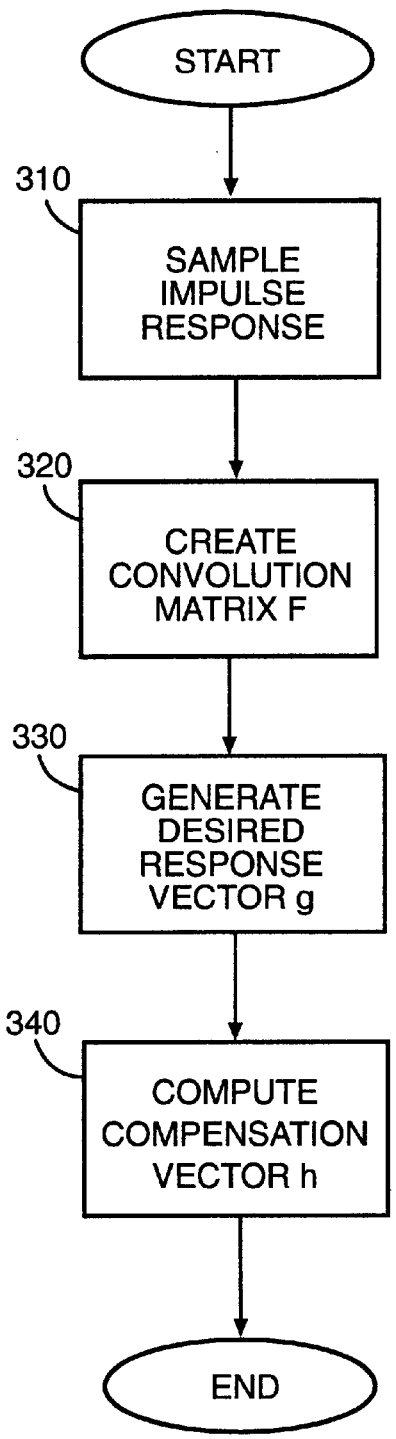
FIG. 5 shows one process flow for determining the compensation pre-distortion utilized by the phase distorter of FIG. 3.

One possible process flow for determining compensation vector h is shown in FIG. 5. The impulse response of the frequency synthesizer 140 $f(t)$ is determined either analytically or through empirical means (box 310). Matrix F is formed based on the impulse response of the frequency synthesizer 140 (box 320). The desired response vector g is selected (box 330) and the compensation vector h is thereafter calculated (box 340).

In general terms, basing the reference signal input to PLL 140 on the I and Q signals as modified by the application of compensation vector h (i.e., $\bar{I}$ and $\bar{Q}$) has the effect of pre-distorting the input to the frequency synthesizer 140 so as to compensate for the band-limiting effects of the frequency synthesizer 140. To achieve this, phase distorter 124 is inserted between the differential encoder 122 and the mixers 126,128 and programmed to apply the appropriate pre-distortion h.

By using the present invention, the band-limiting effects of using a frequency synthesizer 140 may be compensated for while retaining the use of numerous other standard, low cost components such as the components of PLL 140, the differential encoder 122, mixers 126,128, etc. Further, the present approach, in some embodiments, allows for the generation of a phase-encoded signal using a phase lock loop having smaller closed loop bandwidth than otherwise possible due to the phase pre-distortion effectively stretching the bandwidth of the phase lock loop while still enabling accurate representation of the phase modulation. Thus, the present invention allows for standard frequency synthesizers to be used, but compensates for some of the shortcomings thereof, allowing for cleaner signals to be produced, such as signals with better adjacent channel power levels.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of controlling a radio transmitter, comprising:
   generating an encoded signal representing data to be transmitted;
   determining a first phase distortion associated with a frequency synthesizer;
   determining a pre-distortion that substantially counteracts said first phase distortion;
   applying said phase pre-distortion to said encoded signal to create a phase reference signal Y;
   supplying said phase reference signal Y to said frequency synthesizer as a reference signal and producing an output from said frequency synthesizer based on said phase reference signal Y;
   transmitting a signal based on said output of said frequency synthesizer.

2. The method of claim 1 wherein said frequency synthesizer comprises a phase-lock loop responsive to a reference input and wherein supplying said phase reference signal Y to said frequency synthesizer as a reference signal comprises supplying said phase reference signal Y to said phase-lock loop as said phase-lock loop reference input.

3. The method of claim 2 wherein said phase-lock loop consists essentially of a phase comparitor, a loop filter, a voltage controlled oscillator, and a feedback mixer.

4. The method of claim 1 wherein:
   generating an encoded signal representing data to be transmitted comprises generating inphase and quadrature signals representing data to be transmitted; and
   applying said phase pre-distortion to said encoded signal to create a phase reference signal Y comprises applying said phase pre-distortion to said inphase signal and said quadrature signal to produce a pre-distorted inphase signal and a pre-distorted quadrature signal.

5. The method of claim 4 wherein said applying said phase pre-distortion to said encoded signal to create a phase reference signal Y further comprises combining said pre-distorted distorted inphase signal and said pre-distorted quadrature signal to produce said phase reference signal Y.

6. The method of claim 1 wherein applying said phase pre-distortion to said encoded signal to create a phase reference signal Y comprises applying said phase pre-distortion to said encoded signal at a first location to create a phase reference signal Y and wherein said first phase distortion and said phase pre-distortion are related such that $$\min_h \|Fh - g\|^2$$

where impulse matrix F represents the first phase distortion associated with said frequency synthesizer, compensation vector h represents said phase pre-distortion, and desired response vector g represents the ideal system response from just before said first location through said frequency synthesizer.

7. The method of claim 1 wherein applying said phase pre-distortion to said encoded signal to create a phase reference signal Y comprises applying said phase pre-distortion to said encoded signal at a first location to create a phase reference signal Y and wherein said first phase distortion and said phase pre-distortion are related such that $$h = c \frac{\sum_i g_i}{\sum_i c_i}$$

where compensation vector h represents said phase pre-distortion and desired response vector g represents the ideal system response from just before said first location through said frequency synthesizer and wherein $c=(F^T F)^{-1} F^T g$ where impulse matrix F represents said first phase distortion associated with said frequency synthesizer.

8. The method of claim 7 wherein said impulse matrix F takes the form:

$$F = \begin{bmatrix} f_0 & 0 & \cdots & 0 \\ f_1 & f_0 & \ddots & 0 \\ \vdots & f_1 & \ddots & 0 \\ f_{N-1} & \vdots & \ddots & f_0 \\ 0 & f_{N-1} & \ddots & f_1 \\ \vdots & \ddots & \ddots & \vdots \\ 0 & \cdots & 0 & f_{N-1} \end{bmatrix}$$

where $f_0, f_1, \ldots f_{N-1}$ are the coefficients of an N×1 vector $f$ representing the sampled impulse response of said frequency synthesizer.

9. A radio transmitter, comprising:
a phase distorter receiving inphase and quadrature signals representing data to be transmitted and applying a pre-distortion thereto to generate pre-distorted inphase and pre-distorted quadrature signals based upon said inphase and quadrature signals;
a combiner combining said pre-distorted inphase and pre-distorted quadrature signals to produce a phase reference signal Y based thereon; and
a frequency synthesizer receiving said phase reference signal as a reference input thereto and producing a phase encoded signal based thereon.

10. The radio transmitter of claim 9 wherein said frequency synthesizer comprises a phase lock loop responsive to a reference input and wherein said reference input comprises said phase reference signal Y.

11. The radio transmitter of claim 10 wherein said phase-lock loop consists essentially of a phase comparator, a loop filter, a voltage controlled oscillator, and a feedback mixer.

12. The radio transmitter of claim 11 wherein said phase-lock loop generates a constant envelope phase modulated phase encoded signal based on said phase reference signal.

13. The radio transmitter of claim 9 further comprising a first mixer mixing said pre-distorted inphase signal from a baseband frequency to an intermediate frequency and a second mixer mixing said pre-distorted quadrature signal from a baseband frequency to an intermediate frequency, and wherein said combiner is disposed downstream from said first and second mixers.

14. The radio transmitter of claim 9 further comprising an amplifier and an amplitude generator; said amplitude generator receiving said inphase and quadrature signals and generating an amplitude encoded signal based thereon; said amplifier generating an amplitude and phase modulated transmit signal based on said phase encoded signal and said amplitude encoded signal.

15. The radio transmitter of claim 9 wherein frequency synthesizer has a first phase distortion associated therewith and wherein said pre-distortion applied by said phase distorter comprises a compensation vector h satisfying the equation:

$$h = c \frac{\sum_i g_i}{\sum_i c_i}$$

where desired response vector g represents the ideal system response through said phase distorter, said combiner, and said frequency synthesizer, and wherein $c=(F^T F)^{-1} F^T g$ where impulse matrix F represents said first phase distortion associated with said frequency synthesizer.

16. The radio transmitter of claim 15 wherein said impulse matrix F takes the form:

$$F = \begin{bmatrix} f_0 & 0 & \cdots & 0 \\ f_1 & f_0 & \ddots & 0 \\ \vdots & f_1 & \ddots & 0 \\ f_{N-1} & \vdots & \ddots & f_0 \\ 0 & f_{N-1} & \ddots & f_1 \\ \vdots & \ddots & \ddots & \vdots \\ 0 & \cdots & 0 & f_{N-1} \end{bmatrix}$$

where $f_0, f_1, \ldots f_{N-1}$ are the coefficients of an N×1 vector $f$ representing the sampled impulse response of said frequency synthesizer.

17. A method of controlling a wireless communications mobile terminal, comprising:
generating an encoded signal representing data to be transmitted;
determining a first phase distortion associated with a frequency synthesizer;
determining a pre-distortion that substantially counteracts said first phase distortion;
applying said phase pre-distortion to said encoded signal to create a phase reference signal Y;
supplying said phase reference signal Y to said frequency synthesizer as a reference signal and producing an output from said frequency synthesizer based on said phase reference signal Y;
transmitting a signal based on said output of said frequency synthesizer.

18. The method of claim 17 wherein said frequency synthesizer comprises a phase-lock loop responsive to a reference input and wherein supplying said phase reference signal Y to said frequency synthesizer as a reference signal comprises supplying said phase reference signal Y to said phase-lock loop as said phase-lock loop reference input.

19. The method of claim 18 wherein said phase-lock loop consists essentially of a phase comparator, a loop filter, a voltage controlled oscillator, and a feedback mixer.

20. The method of claim 17 wherein:
generating an encoded signal representing data to be transmitted comprises generating inphase and quadrature signals representing data to be transmitted; and
applying said phase pre-distortion to said encoded signal to create a phase reference signal Y comprises applying said phase pre-distortion to said inphase signal and said quadrature signal to produce a pre-distorted inphase signal and a pre-distorted quadrature signal.

21. The method of claim 20 wherein said applying said phase pre-distortion to said encoded signal to create a phase reference signal Y further comprises combining said pre-distorted distorted inphase signal and said pre-distorted quadrature signal to produce said phase reference signal Y.

22. The method of claim 17 wherein applying said phase pre-distortion to said inphase signal and said quadrature signal to produce a pre-distorted inphase signal and a pre-distorted quadrature signal comprises applying said phase pre-distortion to said inphase signal and said quadrature signal at a first location to produce a pre-distorted inphase signal and a pre-distorted quadrature signal, and wherein said first phase distortion and said phase pre-distortion are related such that $$\min_h \|Fh - g\|^2$$

where impulse matrix F represents the first phase distortion associated with said frequency synthesizer, compensation vector h represents said phase pre-distortion, and desired response vector g represents the ideal system response from just before said first location through said frequency synthesizer.

23. The method of claim 17 wherein applying said phase pre-distortion to said inphase signal and said quadrature signal to produce a pre-distorted inphase signal and a pre-distorted quadrature signal comprises applying said phase pre-distortion to said inphase signal and said quadrature signal at a first location to produce a pre-distorted inphase signal and a pre-distorted quadrature signal, and wherein said first phase distortion and said phase pre-distortion are related such that $$h = c \frac{\sum_i g_i}{\sum_i c_i}$$

where compensation vector h represents said phase pre-distortion and desired response vector g represents the ideal system response from just before said first location through said frequency synthesizer and wherein $c=(F^TF)^{-1}F^Tg$ where impulse matrix F represents said first phase distortion associated with said frequency synthesizer.

24. The method of claim 23 wherein said impulse matrix F takes the form:

$$F = \begin{bmatrix} f_0 & 0 & \cdots & 0 \\ f_1 & f_0 & \ddots & 0 \\ \vdots & f_1 & \ddots & 0 \\ f_{N-1} & \vdots & \ddots & f_0 \\ 0 & f_{N-1} & \ddots & f_1 \\ \vdots & \ddots & \ddots & \vdots \\ 0 & \cdots & 0 & f_{N-1} \end{bmatrix}$$

where $f_0, f_1, \ldots f_{N-1}$ are the coefficients of an N×1 vector $f$ representing the sampled impulse response of said frequency synthesizer.

25. A wireless communications mobile terminal, comprising:
a phase distorter receiving inphase and quadrature signals representing data to be transmitted and applying a pre-distortion thereto to generate pre-distorted inphase and pre-distorted quadrature signals based upon said inphase and quadrature signals;

a combiner combining said pre-distorted inphase and pre-distorted quadrature signals to produce a phase reference signal Y based thereon; and a frequency synthesizer receiving said phase reference signal Y as a reference input thereto and producing a phase encoded signal based thereon.

26. The mobile terminal of claim 25 wherein said frequency synthesizer comprises a phase lock loop responsive to a reference input and wherein said reference input comprises said phase reference signal Y.

27. The mobile terminal of claim 26 wherein said phase-lock loop consists essentially of a phase comparitor, a loop filter, a voltage controlled oscillator, and a feedback mixer.

28. The mobile terminal of claim 27 wherein said phase-lock loop generates a constant envelope phase modulated phase encoded signal based on said phase reference signal.

29. The mobile terminal of claim 25 further comprising a first mixer mixing said pre-distorted inphase signal from a baseband frequency to an intermediate frequency and a second mixer mixing said pre-distorted quadrature signal from a baseband frequency to an intermediate frequency, and wherein said combiner is disposed downstream from said mixers.

30. The mobile terminal of claim 25 further comprising an amplifier and an amplitude generator; said amplitude generator receiving said inphase and quadrature signals and generating an amplitude encoded signal based thereon; said amplifier generating an amplitude and phase modulated transmit signal based on said phase encoded signal and said amplitude encoded signal.

31. The mobile terminal of claim 25 wherein frequency synthesizer has a first phase distortion associated therewith and wherein said pre-distortion applied by said phase distorter comprises a compensation vector h satisfying the equation:

$$h = c \frac{\sum_i g_i}{\sum_i c_i}$$

where desired response vector g represents the ideal system response through said phase distorter, said combiner, and said frequency synthesizer, and wherein $c=(F^TF)^{-1}F^Tg$ where impulse matrix F represents said first phase distortion associated with said frequency synthesizer.

32. The mobile terminal of claim 31 wherein said impulse matrix F takes the form:

$$F = \begin{bmatrix} f_0 & 0 & \cdots & 0 \\ f_1 & f_0 & \ddots & 0 \\ \vdots & f_1 & \ddots & 0 \\ f_{N-1} & \vdots & \ddots & f_0 \\ 0 & f_{N-1} & \ddots & f_1 \\ \vdots & \ddots & \ddots & \vdots \\ 0 & \cdots & 0 & f_{N-1} \end{bmatrix}$$

where $f_0, f_1, \ldots f_{N-1}$ are the coefficients of an N×1 vector $f$ representing the sampled impulse response of said frequency synthesizer.

* * * * *